2,805,937

LEACHING OF REFRACTORY ALLOYS

Hans O. Bennedsen, New York, N. Y., and Felix A. Schaufelberger, Stamford, Conn.

No Drawing. Application August 20, 1954, Serial No. 451,286

5 Claims. (Cl. 75—101)

This invention relates to hydrometallurgy and more particularly to a hydrometallurgical process for leaching alloys. Still more particularly, it relates to a hydrometallurgical process for leaching those alloys which are unusually resistant to other leaching methods.

Illustrative of the problems solved by the present invention are those found in leaching processes for separately recovering non-ferrous metals from iron alloys, ferronickel, for example. Several such processes are known. Some have been used. One of the best consists in grinding the illustrative ferronickel to fine particle size and then leaching the particles with an aqueous ammoniacal-ammonium sulfate solution in the presence of oxygen. After boiling for some five to ten hours, nickel will have been solubilized while iron remains in solid oxide form. Unfortunately, this otherwise desirable process requires a fine grinding step, a longer cycle than is desirable and results in the iron being obtained in colloidal, hard-to-filter oxide residues.

Another method comprises treating such alloys with an acid and oxygen at higher temperatures, some 200° C., or higher. Usually aqueous sulfuric acid in amounts about stoichiometric to the non-ferrous metal values in the alloy is used. This solubilizes the non-ferrous metals and iron is converted to an insoluble residue containing iron oxides and basic ferric sulfate. Unfortunately, this process also is subject to several objections. The products are not in a desirable form, even though non-ferrous metals dissolve and iron is substantially all converted to a solid residue. Furthermore, since this process produces hydrogen and uses oxygen, there is an appreciable occupational hazard.

It is an object of this invention to supply a process of leaching desired metals from various alloys which is not subject to the above-noted defects. It is a further object to supply a novel process for safely leaching non-ferrous metals from alloys in a short period of time with high efficiency.

These objects are accomplished in a surprisingly straightforward and effective manner. Chips of the alloy are treated in the presence of iodine with oxygen and a hot aqueous acid solution, the acid content being at least in excess of any non-ferrous metals present in the alloy. When so treated leaching of the desired metals in the alloy is obtained with surprising ease from alloys previously found highly resistant to known leaching processes. Treatment may be batchwise or continuous.

The novel process of the present invention may be practiced on a wide variety of ferrous and non-ferrous alloys. Exemplary of those alloys which are resistant to ordinary leaching methods is ferronickel. It will be discussed here for that purpose. However, the process is equally applicable in treating various non-ferrous metal containing stainless steel alloys and other refractory metal compositions.

A marked advantage of this invention is that the alloy may be and preferably usually is treated in the form of coarse chips. It is quite unnecessary for the alloy to be finely ground.

In the present invention, the critical feature is using the acid in the presence of iodine. According to the present process, iodine per se or a soluble compound containing iodine, for example such compounds as ammonium, sodium and/or potassium iodide, may be employed. When such a treating solution, in contact with alloy chips, is heated to a temperature in the range of about 75–175° C. in the presence of oxygen, the metals in the alloy will swiftly go into solution. The iodine appears to oxidize the metals to produce metal ions. Oxygen, on the other hand, also converts thus-produced iodide back to elemental iodine, which then reacts with more metal. Thus a small amount of iodine, in the presence of oxygen, will serve to rapidly solubilize the metals. Iodine is recovered from the final leach liquor by conventional means.

Generally speaking, it is preferred to add iodine in amounts equivalents to from about one to about ten or twelve percent by weight of the amount of total metal present. In practice, there is no lower limit to the amount of iodine which is to be added, other than that the process requires an unduly long period of time if less than about one percent is used. Some three to about five percent is a good working amount for most purposes.

Neither is there any necessary upper limit as to the amount of iodine which can be used. Iodine seems to aid in the solubilization of most metals in contact with the iodine-containing acid solution. If no air or oxygen is present, iodine equivalent on a mol basis to the total metals to be dissolved is needed. However, in accordance with the present invention, it has been found that supplying oxygen, either as such or from air, allows the use of a small amount of iodine to effect the desired total of metal solubilization. It is unwieldy to add iodine equivalent to total metal when a lesser amount of iodine will serve the same purpose when used in conjunction with oxygen. Use of more than about twelve percent of iodine is seldom economically justifiable.

Iodine is useful in this way only in an acid medium, therefore acid must be present in the leaching solution. Since such non-ferrous metals for example as cobalt, nickel, copper, manganese and zinc will remove acid from the sphere of reaction as they dissolve, it is necessary as a minimum, that the acid content of the leaching solution be at least stoichiometrically equivalent to the non-ferrous metals. The presence of some excess acid must be maintained. Apparently if the pH falls below about three, the iodine ceases to participate satisfactorily in the reactions. The upper limit depends upon whether iron is to be dissolved or not. Iron solubility is minimized at free acid contents below those equivalent to about pH 4 or 5. Since a pH of about three or less is needed, and the process is preferably operated at about 0.5–1.0% or more acid content, usually some iron will dissolve. In many instances, the amount of dissolved iron which remains in solution even at terminal acidities up to about 5% free acid as a practical matter will not be considered as excessive. Therefore, where some dissolved iron is permissible but undesirable, continuous leaching should be carried out at acid contents between about 5% free acid and a pH of about three. In batch operations, more acid may be present during some stages of the leaching, but the terminal conditions should be in the 5% to about pH 3 range to insure reprecipitation as oxides, of any excess of dissolved iron. When iron in the liquor is more objectionable and must be minimized, the slurry of liquor and leached chips may and should be neutralized, as with ammonia, to a pH above about four. Of course iodine should be removed before adding ammonia.

One of the outstanding advantages of the present process is that the amount of acid may be adjusted in accordance with these requirements. Under so-controlled conditions, the alloy content of such non-ferrous metals as nickel, cobalt, and copper can be substantially dissolved into a leach solution as soluble salts; and may be readily recovered therefrom by known means. Iron, on the other hand, can be substantially wholly converted to easily filterable iron oxides, possibly admixed with some basic ferric sulfate. Chromium as an exception apparently is substantially untouched in the present leaching process. Thus in many cases, the present process affords a method of effecting sharp separations.

The amount of oxygen to be used in the present process is not critical since any substantial partial pressure of oxygen, either as such or as air, will serve to maintain the iodine reaction when small amounts of iodine are used. The total pressure must be high enough to prevent boiling when working at the higher temperatures in the 75° C.–175° C. range noted above. There should be at least some positive overpressure of oxygen to assist the reaction. For example, in the preferred range of operating temperature of from about 125°–150° C., using about a 25 p. s. i. g. or more partial pressure of oxygen above the autogenous pressure is a good practice. As little as about five p. s. i. g. oxygen partial pressure may be used. Use of more than about 200 p. s. i. g. does not appear to increase the rate appreciably and economically is of doubtful utility.

Although atmospheric pressure may be used at the lower possible temperatures, so long as sufficient oxygen is maintained in the sphere of reaction, it is still preferred to operate at elevated pressures. Since the oxygen must be maintained available to the reaction, the use of pressure in the ranges discussed above makes control more certain.

The period of time during which the reaction is to be carried out is not critical. It will be dependent to some extent on the size of the alloy particles and on the temperature. Generally speaking, a period of time of from about one-half to about four hours will suffice.

Operation of the leaching circuit of the present process does present a corrosion problem. It must be preferably carried out in reactors having inert linings such as glass, brick or other ceramics or inert resins. However, the speed and efficiency of its recovery of the non-ferrous metals as compared with previous processes more than offsets this inconvenience.

Practice of the process of the present invention may be well exemplified in the following example which is intended as illustrative only and not by way of limitation. Except as otherwise noted, all parts are by weight.

*Example*

About 600 parts of a mixture of scrap ferronickel samples as chips assaying within the following ranges:

| | Percent |
|---|---|
| Ni | 25–27 |
| Co | 0.4–0.5 |
| Fe | 70–74 | and small amounts (0.8 to 2%) of carbon, chromium, sulfur and silicon are combined with 2500 parts of an aqueous solutions containing about 125 g./l. of $H_2SO_4$ and about 35 g./l. of iodine and heated for about two hours at an average temperature of about 125° C., under a pressure of 50 p. s. i. g. maintained with oxygen gas, the reaction mass being flashed to remove iodine, and filtered. Filtrate comprises 98% of the nickel and cobalt as nickel and cobalt sulfate in a solution of weak sulfuric acid (about 1%). Residue comprises substantially hard, crystalline particles of easily-filterable ferric oxide.

We claim:

1. In sulfuric acid leaching of an acid-soluble, non-ferrous metal selected from the group consisting of copper, cobalt, nickel, manganese and zinc from an alloy thereof, which alloy is refractory to attack by aqueous solutions of said acid at temperatures up to about 175° C. in the presence of oxygen, the process which comprises bringing said alloy into reactive contact with an aqueous sulfuric acid leaching solution containing an amount of free acid at least equivalent to that at about pH 3, at from 75° to about 175° C., treating said mixture with an oxidizing agent comprising oxygen gas in the presence of elemental iodine, said iodine being supplied in amount of from about one to about twelve percent by weight of said acid-soluble non-ferrous metal, maintaining the acid content of said leaching solution at above that at about pH 3 during said treatment and continuing said treatment until non-ferrous metal dissolution substantially ceases.

2. A process according to claim 1, wherein said iodine is furnished as a soluble iodine-bearing compound, selected from the group consisting of the ammonium, sodium and potassium iodides.

3. A process according to claim 1, adapted for use when said alloy contains iron and dissolved iron in the leach liquor is not desirable, wherein, in the leach liquor at the end of said treatment, the hydrogen ion concentration is controlled to a value between that of about pH 3 and about that of a 5% aqueous solution of free sulfuric acid.

4. A process according to claim 3, adapted for use when the dissolved iron content of the leach liquor must be minimized, wherein after leaching is completed, the iodine content of the leach solution is removed; the acid content of resultant solution is then adjusted with ammonia to less than that at about pH 4.5, and resultant solids are separated from solution before treatment to recover non-ferrous metals.

5. In sulfuric acid leaching of a non-ferrous base metal selected from the group consisting of copper, cobalt, nickel, manganese and zinc from ferrous alloys thereof, which are refractory to attack by aqueous solutions of said acid at temperatures up to about 175° C. in the presence of oxygen, the process of obtaining a liquor having maximum non-ferrous metal content and a minimum dissolved iron content which comprises: bringing said alloy into contact with an aqueous leaching acid solution containing at least sufficient sulfuric acid to form sulfates of the non-ferrous metals and to provide a terminal hydrogen-ion content of from about that at pH 3 to about that of five percent free acid; in the presence of elemental iodine, supplied in amount of from about one to twelve percent by weight of the non-ferrous metals to be dissolved, in the form of at least one member of the group consisting of elemental iodine and the ammonium, sodium and potassium iodides, treating said mixture with an oxidizing gas comprising oxygen; continuing treatment until dissolution of non-ferrous metal substantially ceases; removing substantially all the iodine from solution; adjusting the solution with ammonia to an acid pH above about 4.5 and separating resultant solution from solids.

References Cited in the file of this patent

UNITED STATES PATENTS

| 874,496 | Gates et al. | Dec. 24, 1907 |
| 971,252 | Clancy | Sept. 27, 1910 |
| 981,451 | McKechnie | Jan. 10, 1911 |
| 1,949,927 | Corson | Mar. 6, 1934 |
| 2,304,823 | Harrison | Dec. 15, 1942 |

FOREIGN PATENTS

| 480,271 | Italy | Apr. 24, 1953 |

OTHER REFERENCES

Evans: "Corrosion of Metals," London; Arnold and Co., 1926, pgs. 26 and 106.

Mellor: "Comprehensive Treatise on Inorganic and Theoretical Chemistry," vol. 15, London; Longmans, 1936, pages 151, 201.

Willard et al.: "Advanced Quantitative Analysis," New York; Van Nostrand, 1943, page 32.